United States Patent
Naenko et al.

(10) Patent No.: US 10,884,782 B1
(45) Date of Patent: *Jan. 5, 2021

(54) VIRTUAL MACHINE EXIT PROCESSING ACCELERATOR

(71) Applicant: Parallels International GmbH, Schaffhausen (CH)

(72) Inventors: Andrey N. Naenko, Moscow (RU); Alexey B. Koryakin, Moscow (RU); Nikolay N. Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/591,615

(22) Filed: Oct. 2, 2019

Related U.S. Application Data

(63) Continuation of application No. 15/962,238, filed on Apr. 25, 2018, now Pat. No. 10,481,941, which is a continuation of application No. 15/215,893, filed on Jul. 21, 2016, now Pat. No. 10,019,282.

(51) Int. Cl.
*G06F 9/455* (2018.01)

(52) U.S. Cl.
CPC ........... *G06F 9/45558* (2013.01); *G06F 2009/45575* (2013.01); *G06F 2009/45579* (2013.01)

(58) Field of Classification Search
None
See application file for complete search history.

(56) References Cited

U.S. PATENT DOCUMENTS

| 9,274,823 B1 | 3/2016 | Koryakin et al. |
| 2013/0159999 A1 | 6/2013 | Chiueh et al. |

OTHER PUBLICATIONS

USPTO, Office Action for U.S. Appl. No. 15/962,238, dated Apr. 2, 2019.
USPTO, Notice of Allowance for U.S. Appl. No. 15/962,238, dated Jul. 3, 2019.
USPTO, Notice of Allowance for U.S. Appl. No. 15/215,893, dated Feb. 12, 2018.

*Primary Examiner* — Gregory A Kessler
(74) *Attorney, Agent, or Firm* — Rosenberg, Klein & Lee

(57) ABSTRACT

Systems and methods for implementing a virtual machine (VM) exit processing accelerator. An example method comprises: intercepting, by a VM exit processing accelerator, a VM exit associated with the virtual machine; responsive to determining that an identifier of a reason of the VM exit satisfies a first condition, processing the VM exit by the VM exit processing accelerator; and resuming execution of the virtual machine.

18 Claims, 5 Drawing Sheets

VIRTUAL MACHINE EXIT PROCESSING ACCELERATOR

RELATED APPLICATIONS

This application is a continuation of U.S. patent application Ser. No. 15/962,238 filed on Apr. 25, 2018, which is a continuation of U.S. patent application Ser. No. 15/215,893 filed on Jul. 21, 2016. The entire content of both above-identified application is incorporated by reference herein.

TECHNICAL FIELD

The present disclosure is generally related to computer systems, and is specifically related to systems and methods for employing hardware-assisted virtualization for implementing a virtual machine exit processing accelerator.

BACKGROUND

Virtualization may be viewed as abstraction of hardware components into logical objects in order to allow a computer system to execute various software modules, for example, multiple operating systems, concurrently and in isolation from other software modules. Virtualization may be achieved by running a software layer, often referred to as a "virtual machine monitor" or "hypervisor," above the hardware and below the virtual machines. A hypervisor may abstract the physical layer and present this abstraction to virtual machines to use, by providing interfaces between the underlying hardware and virtual devices of virtual machines. For example, processor virtualization may be implemented by the hypervisor scheduling time slots on one or more physical processors for a virtual machine, rather than a virtual machine actually having a dedicated physical processor.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
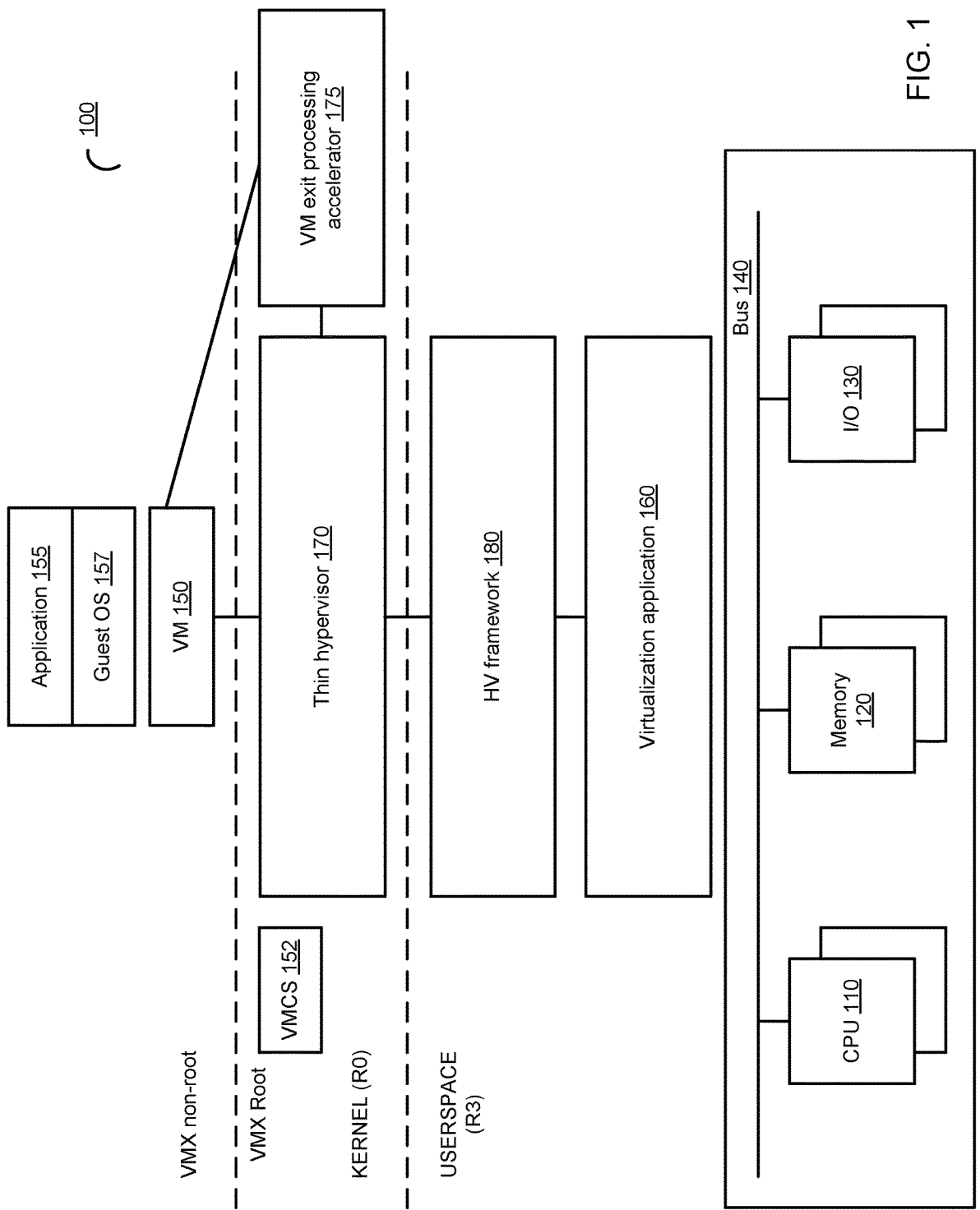
FIG. 1 depicts a high-level diagram of an example computer system 100 in which a VM exit processing accelerator may be implemented, in accordance with one or more aspects of the present disclosure.

Described herein are systems and methods for implementing a virtual machine (VM) exit processing accelerator.

Certain processor architectures provide hardware support for virtualization by implementing special instructions for facilitating virtual machine execution. In certain implementations, a processor may support executing, at an elevated privilege level, a virtual machine monitor (VMM) that acts as a host and has full control of the processor and other platform hardware. A VMM presents a virtual machine with an abstraction of one or more virtual processors. A VMM is able to retain selective control of processor resources, physical memory, interrupt management, and input/output (I/O). A virtual machine implements a software environment which may be represented by a stack including a guest operating system (OS) and application software. A virtual machine may operate independently of other virtual machines and use the VMM-facilitated interface to the processors, memory, storage, graphics, and I/O provided by a physical platform, so that the VMM may retain control of the physical platform resources.

A transition from the VMM execution mode (also referred to as VMX root operation in certain processor architectures) to the guest execution mode (also referred to as VMX non-root operation) is referred to as a VM entry and may be performed by invoking a special Instruction Set Architecture (ISA)-dependent instruction (e.g., VMLAUNCH/VMRESUME). The reverse transition, i.e., transition from the guest execution mode to the VMM execution mode is referred to as a VM exit and is initiated by the VMM to force processor to switch the execution mode in response to detecting one of the triggering events (such as an attempt to execute a certain privileged instruction or to access a certain memory address), as described in more details herein below.

Thus, when executed in the guest execution mode, certain instructions and events, instead of their ordinary operation, cause VM exits to the VMM. Because these VM exits modify the virtual processor's ordinary behavior, the functionality of software in the guest execution mode is limited. It is this limitation that allows the VMM to retain control of processor resources and prevent the virtual machine from executing an operation that would corrupt the host state. Because the guest execution mode places restrictions even on software running on the virtual processor with the current privilege level (CPL) of zero, the guest software may run at the privilege level for which it was originally designed.

The guest operation is controlled by a special data structure, which in various processor architectures is referred to as a virtual-machine control structure (VMCS) or as a virtual-machine control block (VMCB), although other terms may be used to refer to the data structure. The VMM may use a dedicated VMCS for each virtual machine that it supports. For a virtual machine with multiple logical processors (virtual processors), the VMM may use a dedicated VMCS for each virtual processor.

The VMCS comprises host state fields, guest state fields, VM exit control fields, and VM exit information fields. One or more VM exit control fields may be employed to specify the conditions that would trigger a VM exit, while one or more VM exit information fields may receive information on VM exits and describe the cause and the nature of VM exits. In certain implementations, VM exit information fields comprise a VM exit reason field specifying an identifier of the reason for the VM exit and a VM exit qualification field specifying additional information about the cause of the VM exit.

VMM may, by modifying a certain VMCS field, specify an entry point for a VM exit handler, to which a VM exit would transfer control. Responsive to receiving the control, the VM exit handler may analyze the cause of the VM exit, take appropriate action, and then resume the virtual machine by executing a VM entry instruction (e.g., VMLAUNCH/VMRESUME).

The ability of the VMM to specify the entry point of the VM exit handler is advantageously exploited by systems and methods of the present disclosure for implementing a VM exit processing accelerator for processing certain VM exits without transferring control to the VMM. In accordance with one or more aspects of the present disclosure, a VM exit processing accelerator, upon being initialized, substitutes a reference to the VMM handler in the above-mentioned VMCS field with a reference to itself, so that the subsequent VM exits would transfer control to the VM exit processing accelerator. Upon receiving a VM exit, the accelerator analyzes the VMCS field specifying the reason for the VM exit, and may either process the VM exit and resume the execution of the virtual machine or pass the execution control through to the previously saved address of the original VM exit handler within the VMM.

This approach may be advantageously employed in association with a thin hypervisor facilitating execution of a virtualization userspace application implementing a virtual execution environment for executing potentially unsafe third party code, as described in more details herein below.

Various aspects of the above referenced methods and systems are described in details herein below by way of examples, rather than by way of limitation.

FIG. 1 depicts a high-level diagram of an example computer system 100 in which a VM exit processing accelerator may be implemented, in accordance with one or more aspects of the present disclosure. The computer system 100 may include one or more central processing units (CPU) 110, also referred to as "processors" herein, communicatively coupled to one or more memory devices 120 and one or more input/output (I/O) devices 130 via a system bus 140.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module. A processor may also be referred to as a central processing unit (CPU). "Memory device" herein refers to a volatile or non-volatile memory, such as RAM, ROM, EEPROM, or any other device capable of storing data. "I/O device" herein refers to a device providing an interface between a processor and an external device capable of inputting and/or outputting binary data. In an illustrative example, an I/O device may be provided by a network interface controller (NIC) or a block I/O device, such as a hard disk.

The computer system 100 may leverage the hardware-assisted virtualization features of the processor 110 in order to implement a virtual execution environment for executing third party code developed for other platforms. In accordance with one or more aspects of the present disclosure, the virtual execution environment may be provided by a virtual machine 150 controlled by a thin hypervisor 170, the functionality of which is effectively limited to providing an interface between the virtual machine 150 and a virtualization userspace application 160, while limiting the ability of the virtualization userspace application 160 to execute certain potentially unsafe operations. Therefore, creation, execution, and termination of the virtual machine 150 is effectively controlled by the virtualization application 160. Since the virtualization application 160 runs in a non-privileged execution mode (e.g., the current privilege level (CPL) of 3), it may be distributed by an OS vendor via a software delivery platform, such as Mac App Store or Microsoft® Windows Store, which is one of the advantages afforded by the present disclosure over known virtualization solutions.

In various implementations, the thin hypervisor 170, which runs in a privileged context (e.g., the CPL of 0), may be implemented as a kernel module, a kernel extension, a driver, or a part of the host operating system. By virtue of fully controlling the behavior of the virtual machine 150, the thin hypervisor 170 may prevent the virtual machine from executing an operation that would corrupt the host state.

Communications of the virtualization application 160 and the thin hypervisor 170 may be facilitated by the hypervisor framework 180, which may expose an application programming interface (API) to the virtualization application 160. Thus, the virtualization application 160 may execute the API calls of the hypervisor framework 180 to invoke various functions of the thin hypervisor 170 in order to read/write certain elements of the VMCS 152 associated with virtual machine 150, read/write registers of virtual processors of the virtual machine 150, map userspace memory of the host computer system 100 to guest memory of the virtual machine 150, execute application code by a virtual processor of the virtual machine 150, and/or perform certain other actions to control execution of a third-party application 155 by the guest OS 157 of the virtual machine 150.

In certain implementations, the virtualization application 160 may further implement a graphical user interface (GUI) intercepting user input and displaying graphical output generated by the guest software.

As noted herein above, certain instructions executed and/or certain events occurring in the guest execution mode may cause VM exits, which are processed by the thin hypervisor 170, thus allowing the thin hypervisor 170 to retain control of certain processor resources. The thin hypervisor 170 may pass the VM exit reason and other relevant information, via the thin hypervisor framework 180, through to the virtualization application 160, which thus exercises control over the execution of the virtual machine 150, as described in more details herein below.

Figure 2:
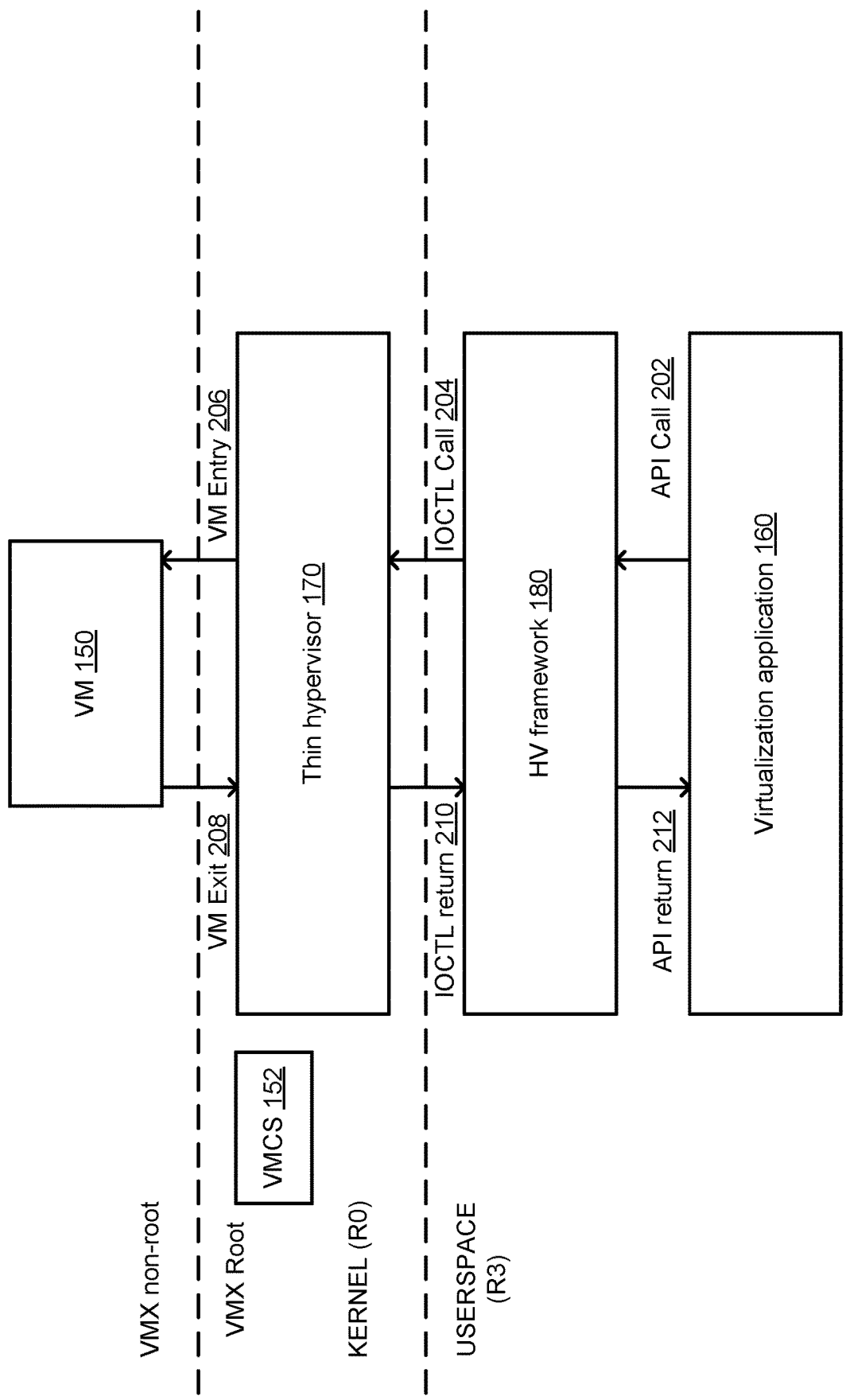
FIG. 2 depicts an example interaction diagram illustrating the sequence of interactions of components of an example computer system for executing guest code by a virtual machine, in accordance with one or more aspects of the present disclosure.

FIG. 2 depicts an example interaction diagram illustrating the sequence of interactions of components of the computer system 100 for executing guest code by the virtual machine 150 of FIG. 1, in accordance with one or more aspects of the present disclosure. In the illustrative example of FIG. 2, the virtualization application 160 may execute an API call 202 to the hypervisor framework 180 in order to request the thin hypervisor 170 to run guest code by a specified virtual processor of the virtual machine 150. Upon receiving the API call, the hypervisor framework 180 may execute a system call 204 (or some other type of call, such as an IOCTL call) to the thin hypervisor 170, which in response may initialize a VMCS 152 associated with the virtual machine 150, save the host context, and transfer control to the virtual machine 150 by executing a VM entry instruction 206 (e.g., VMLAUNCH/VMRESUME).

The VM entry instruction causes execution of the guest code in the guest execution mode (also referred to as VMX non-root execution mode in certain processor architectures) until a privileged operation, which is specified by a VM exit control field of VMCS 152, is attempted. Such a privilege operation would cause a VM exit 208, thus transferring control to the VM exit handler provided by the thin hypervisor 170.

Responsive to receiving the control, the thin hypervisor 170 may restore the previously saved host context, and transfer control to the hypervisor framework 180 by returning 210 from the system call (or IOCTL call) 204 that was previously executed by the hypervisor framework 180 to cause the guest code execution. Consequently, the hypervisor framework 180 may transfer control back to the virtualization application 160 by returning 212 from the API call 202 executed by the virtualization application 160 to cause the guest code execution. Responsive to receiving the control, the virtualization application 160 may analyze the cause of the VM exit by executing API calls to the hypervisor framework 180 to read VMCS fields and/or guest registers. Then, the virtualization application 160 may take appropriate action in response to the VM exit and execute a new API call to the hypervisor framework 180 in order to request the thin hypervisor 170 to continue run the guest code by the virtual machine 150.

Thus, a typical interaction between the virtualization application 160 and the virtual machine 150 may involve a series of control transfers between multiple abstraction layers represented by the corresponding code modules, including the hypervisor framework 180 and the thin hypervisor 170. Those control transfers represent the execution overhead and may adversely affect the operational efficiency of the virtualization solution.

The present disclosure improves the operational efficiency of the virtualization application 160 by employing a VM exit processing accelerator for processing certain VM exits without transferring control to the thin hypervisor 170.

Figure 3:
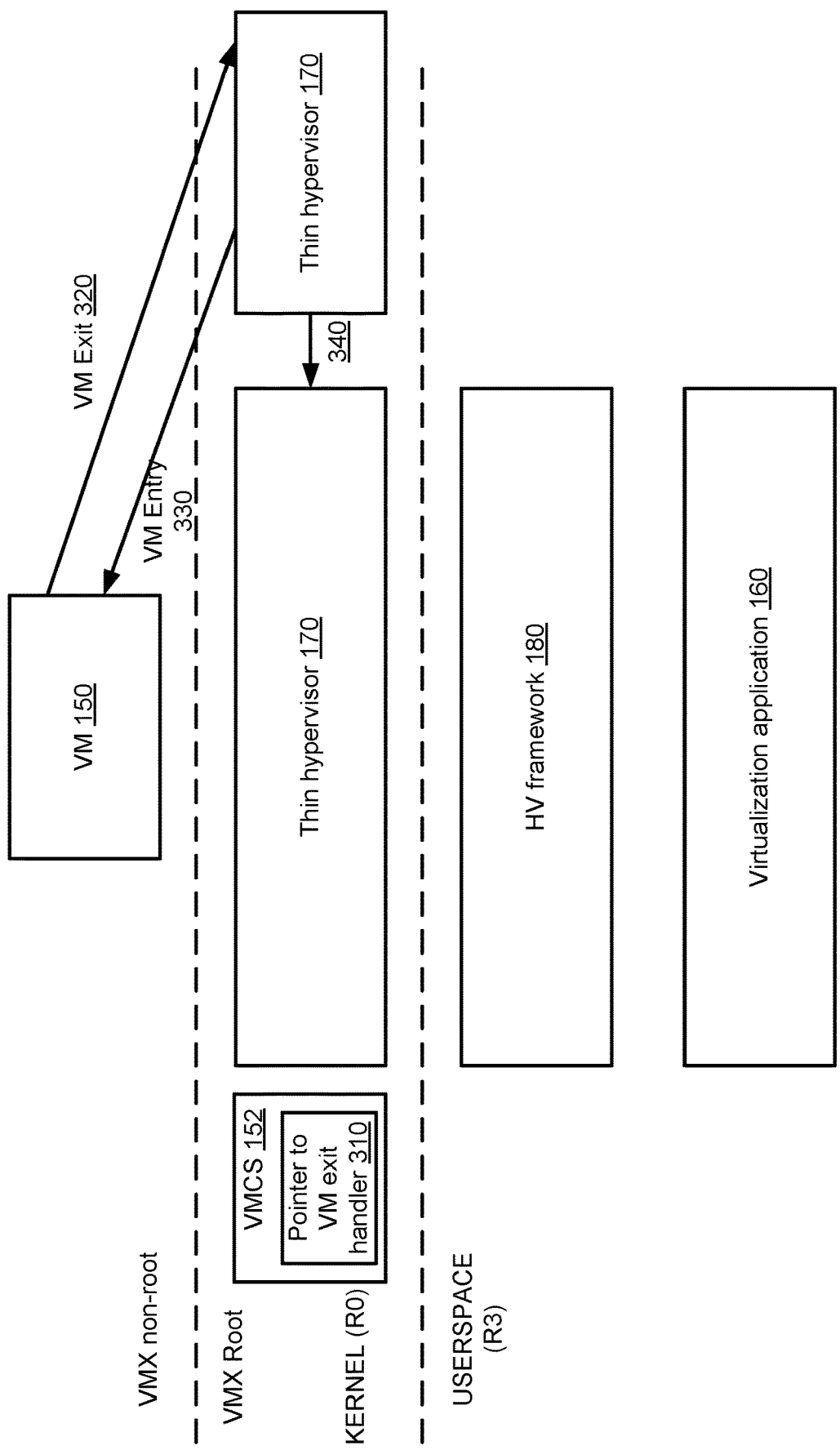
FIG. 3 depicts an example interaction diagram illustrating the sequence of interactions of components of an example computer system for processing VM exits by a VM exit processing accelerator, in accordance with one or more aspects of the present disclosure.

FIG. 3 depicts an example interaction diagram illustrating the sequence of interactions of the example components of computer system for processing VM exits by VM exit processing accelerator, in accordance with one or more aspects of the present disclosure. In certain implementations, the VM exit processing accelerator 175 may, upon initialization, save the value of the VMCS field 310 specifying the address of the VM exit handler (which would presumably be referencing the VM exit handler of the thin hypervisor 170), and then overwrite the VMCS field 310 with the reference to itself, so that the subsequent VM exits would transfer control to the VM exit processing accelerator, rather than to thin hypervisor 170. Alternatively, saving the value of the VMCS field 310 and overwrite the VMCS field 310 with the reference to the VM exit processing accelerator 175 may be performed by other components.

Responsive to receiving a VM exit 320, VM exit processing accelerator 175 may analyze the VMCS field identifying the reason for the VM exit. Should the VMCS field indicate a VM exit reason which may be handled by VM exit processing accelerator 175, the accelerator processes the VM exit and returns control to the virtual machine by executing a VM entry instruction (e.g., VMLAUNCH/VMRESUME) 330. In an illustrative example, the VM exit may be caused by attempting to execute CPUID instruction, by which the guest software determines software attempts to determines the processor type and/or the presence of certain processor features (like MMX/SSE). As VM exit processing accelerator 175 may be distributed by the vendor of virtualization application 160, and therefore may be aware of the existence and configuration of virtualization application 160, VM exit processing accelerator 175 may be configured to respond to CPUID instruction by modifying the appropriate virtual processor registers and resuming the execution of the virtual machine.

Should the VMCS field indicate a VM exit reason which VM exit processing accelerator 175 is not prepared to handle, VM exit processing accelerator 175 may transfer the control 340 to the previously saved address of the original VM exit handler (e.g., the VM exit handler of the thin hypervisor 170).

Therefore, the present disclosure provides a method for intercepting VM exits by the VM exit processing accelerator which may process certain types of VM exits or pass other types of VM exits through to the original VM exit handler. In certain implementations, the hypervisor providing the original VM exit handler may not be aware of the existence and activity of the VM exit processing accelerator, unless the hypervisor would monitor the contents of the VMCS field that specified the VM exit handler address. Thus, in various implementations, the VM exit processing accelerator operating in accordance with one or more aspects of the present disclosure may be advantageously employed for extending and/or modifying the functionality of the hypervisor, for hypervisor code debugging, and/or guest code profiling.

In certain implementations, two or more VM exit processing accelerators may be installed in a chained fashion, such that each VM exit processing accelerator in the chain is aware of its predecessor in the chain, but is not necessarily is aware of any of its successors in the chain. The chained sequence of VM exit processing accelerators operating in accordance with one or more aspects of the present disclosure may be advantageously employed for extending and/or modifying the functionality of the hypervisor, for hypervisor code debugging, and/or guest code profiling.

Figure 4:
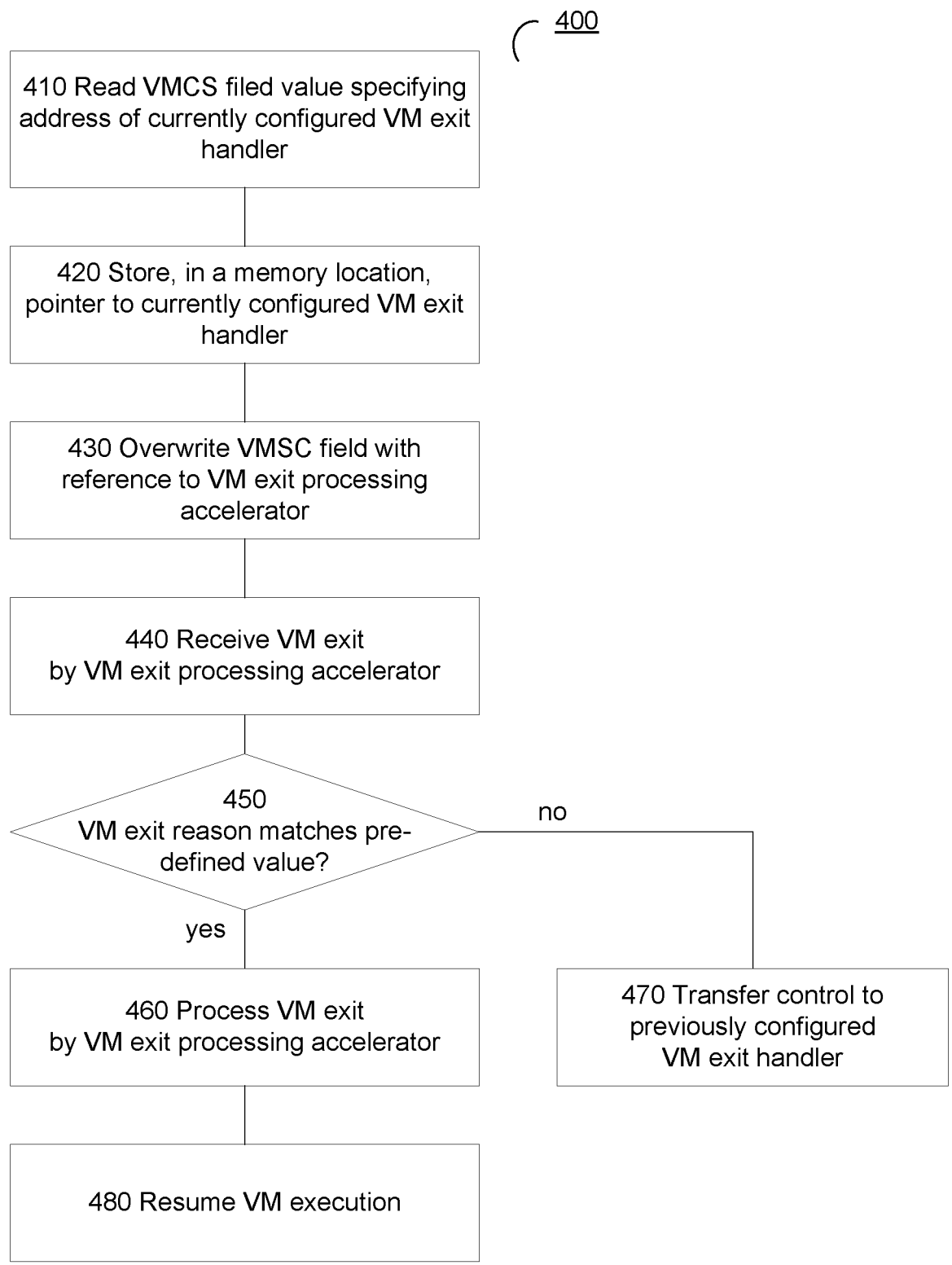
FIG. 4 depicts a flow diagram of a method of processing a VM exit by a VM exit processing accelerator, in accordance with one or more aspects of the present disclosure.

FIG. 4 depicts a flow diagram of one illustrative example of method 400 of processing VM exits by a VM exit processing accelerator, in accordance with one or more aspects of the present disclosure. Method 400 and/or each of its individual functions, routines, subroutines, or operations may be performed by one or more processing devices of the computer system (e.g., computer system 100 of FIG. 1) implementing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a processing device implementing the method may read the value of the VMCS field specifying the address of the currently configured VM exit handler (which in certain implementations may reference the VM exit handler of a thin hypervisor providing an interface between the virtual machine and a virtualization application being executed in a non-privileged execution mode), as described in more details herein above.

At block 420, the processing device may store, in a memory location, the pointer to the currently configured VM exit handler, as described in more details herein above.

At block 430, the processing device may overwrite the VMCS field with a reference to a VM exit processing accelerator operating in accordance with one or more aspects of the present disclosure, so that the subsequent VM exits would transfer control to the VM exit processing accelerator, rather than to the currently active VM exit handler, as described in more details herein above.

At block 440, the processing device may receive, by the VM exit processing accelerator, a VM exit associated with a virtual machine, as described in more details herein above.

At block 450, the processing device may read, from the VMCS associated with the virtual machine, an identifier of the reason of the VM exit. Responsive to determining that the identifier of the reason of the VM exit satisfies a certain condition (such as matches a pre-defined or dynamically calculated value or matches a certain rule), the processing device may, at block 460, process the VM exit by the VM exit processing accelerator, as described in more details herein above. Otherwise, the processing device may, at block 470, use the stored pointer value to transfer control to the previously configured VM exit handler.

At block 480, the processing device may resume execution of the virtual machine, as described in more details herein above, and the method may terminate.

Figure 5:
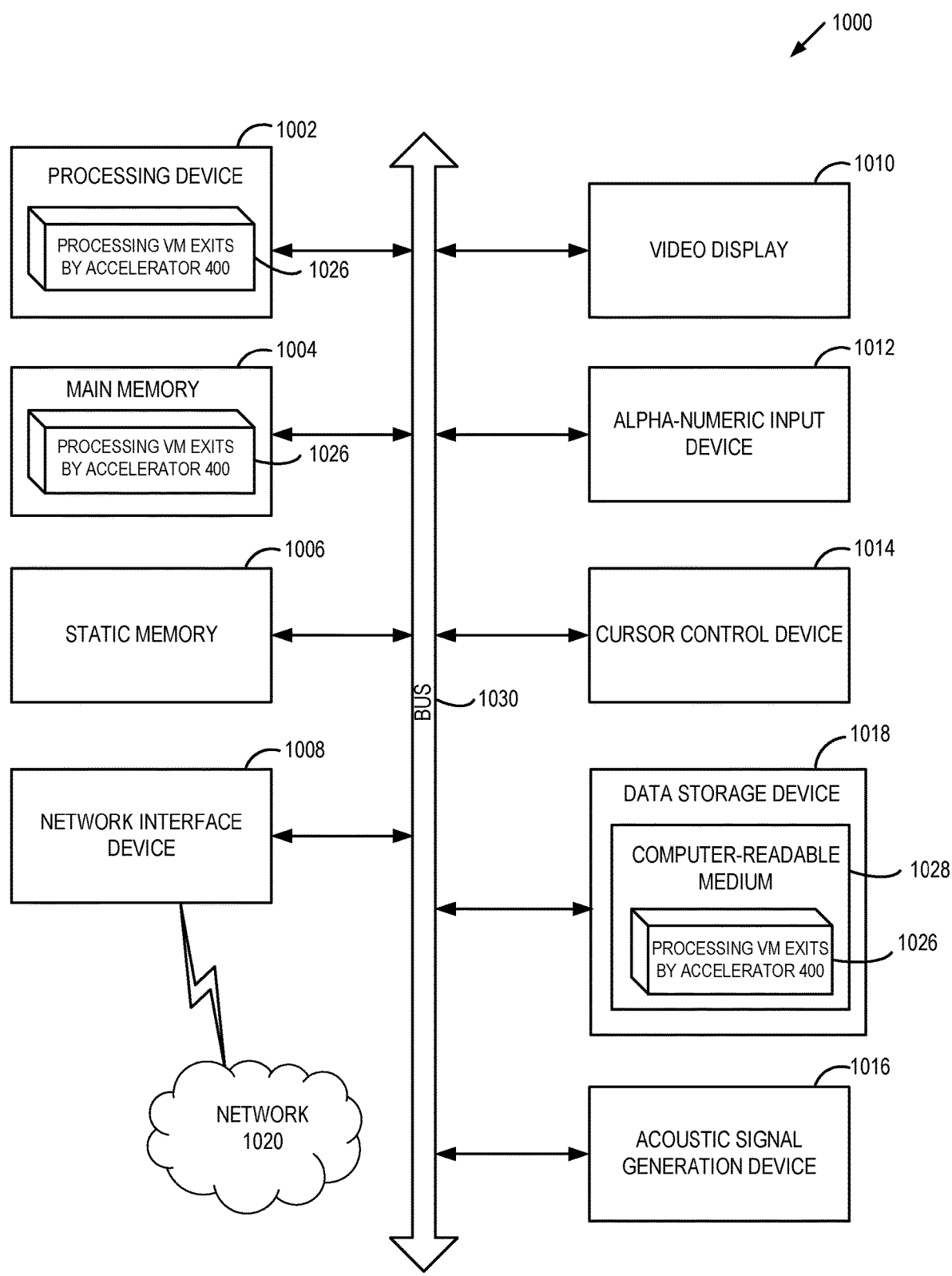
FIG. 5 depicts a block diagram of an example computer system operating in accordance with one or more aspects of the present disclosure.

FIG. 5 schematically illustrates a component diagram of an example computer system 1000 which may perform any one or more of the methods described herein. In various illustrative examples, computer system 1000 may represent example computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing method 400 of processing VM exits by a VM exit processing accelerator.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of method 400 of processing VM exits by a VM exit processing accelerator.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   storing, in a memory location, a virtual machine (VM) exit handler address specified by a processor-specific data structure associated with a virtual machine;
   intercepting, by a VM exit processing accelerator, a VM exit associated with the virtual machine;
   responsive to determining that an identifier of a reason of the VM exit satisfies a first condition, processing the VM exit by the VM exit processing accelerator; and
   resuming execution of the virtual machine.

2. The method of claim 1, further comprising:
   responsive to determining that the identifier of the reason of the VM exit satisfies a second condition, processing the VM exit by a thin hypervisor referenced by the VM exit handler address stored in the memory location, wherein the thin hypervisor provides an interface between the virtual machine and a virtualization application being executed in a non-privileged execution mode.

3. The method of claim 1, further comprising:
   installing a second VM exit processing accelerator in a chained fashion.

4. The method of claim 3, wherein
   installing the second VM exit processing accelerator further comprises:
   storing, in the processor-specific data structure, an address of the second VM exit processing accelerator.

5. The method of claim 3, further comprising:
   processing the VM exit by the second VM exit processing accelerator.

6. The method of claim 1, wherein
   determining that the identifier of the reason of the VM exit satisfies the first condition further comprises reading the identifier from the processor-specific data structure.

7. The method of claim 1, wherein
   the VM exit processing accelerator is executed in a privileged execution mode.

8. A system, comprising:
   a memory; and
   a processing device coupled to the memory, the processing device configured to:
   intercept, by a virtual machine (VM) exit processing accelerator, a VM exit associated with a virtual machine;
   responsive to determining that an identifier of a reason of the VM exit satisfies a first condition, process the VM exit by a thin hypervisor, wherein the thin hypervisor provides an interface between the virtual machine and a virtualization application running in a non-privileged execution mode; and
   resume execution of the virtual machine; wherein
   intercepting the VM exit further comprises storing, in a memory location, a VM exit handler address specified by a processor-specific data structure associated with the virtual machine.

9. A non-transitory computer-readable storage medium comprising executable instructions that, when executed by a processing device, cause the processing device to:
   store, in a memory location, a virtual machine (VM) exit handler address specified by a processor-specific data structure associated with a virtual machine;
   intercept, by a VM exit processing accelerator, a VM exit associated with the virtual machine;
   responsive to determining that an identifier of a reason of the VM exit satisfies a first condition, process the VM exit by the VM exit processing accelerator; and
   resume execution of the virtual machine.

10. The non-transitory computer-readable storage medium of claim 9, further comprising executable instructions that, when executed by the processing device, cause the processing device to:
    responsive to determining that the identifier of the reason of the VM exit satisfies a second condition, process the VM exit by a thin hypervisor referenced by the VM exit handler address stored in the memory location, wherein the thin hypervisor provides an interface between the virtual machine and a virtualization application being executed in a non-privileged execution mode.

11. The non-transitory computer-readable storage medium of claim 9, further comprising executable instructions that, when executed by the processing device, cause the processing device to:
    install a second VM exit processing accelerator in a chained fashion.

12. The non-transitory computer-readable storage medium of claim 11, wherein installing the second VM exit processing accelerator further comprises:

store, in the processor-specific data structure, an address of the second VM exit processing accelerator.

13. The non-transitory computer-readable storage medium of claim 11, further comprising executable instructions that, when executed by the processing device, cause the processing device to:
process the VM exit by the second VM exit processing accelerator.

14. The non-transitory computer-readable storage medium of claim 9, wherein determining that the identifier of the reason of the VM exit satisfies the first condition further comprises reading the identifier from the processor-specific data structure.

15. The non-transitory computer-readable storage medium of claim 9, wherein the VM exit processing accelerator is executed in a privileged execution mode.

16. A system, comprising:
a memory; and
a processing device coupled to the memory, the processing device configured to:
intercept, by a virtual machine (VM) exit processing accelerator, a VM exit associated with a virtual machine;
responsive to determining that an identifier of a reason of the VM exit satisfies a first condition, process the VM exit by a thin hypervisor, wherein the thin hypervisor provides an interface between the virtual machine and a virtualization application running in a non-privileged execution mode; and
resume execution of the virtual machine; wherein
the processing device is further configured to responsive to determining that the identifier of the reason of the VM exit satisfies a second condition, process the VM exit by the VM exit accelerator.

17. A system, comprising:
a memory; and
a processing device coupled to the memory, the processing device configured to:
intercept, by a virtual machine (VM) exit processing accelerator, a VM exit associated with a virtual machine;
responsive to determining that an identifier of a reason of the VM exit satisfies a first condition, process the VM exit by a thin hypervisor, wherein the thin hypervisor provides an interface between the virtual machine and a virtualization application running in a non-privileged execution mode; and
resume execution of the virtual machine; wherein
the processing device is further configured to install a second VM exit processing accelerator in a chained fashion; and
installing the second VM exit processing accelerator comprises:
storing, in a memory location, a VM exit handler address specified by the processor-specific data structure; and
storing, in the processor-specific data structure, an address of the second VM exit processing accelerator.

18. A system, comprising:
a memory; and
a processing device coupled to the memory, the processing device configured to:
intercept, by a virtual machine (VM) exit processing accelerator, a VM exit associated with a virtual machine;
responsive to determining that an identifier of a reason of the VM exit satisfies a first condition, process the VM exit by a thin hypervisor, wherein the thin hypervisor provides an interface between the virtual machine and a virtualization application running in a non-privileged execution mode; and
resume execution of the virtual machine; wherein
intercepting the VM exit further comprises storing, in a memory location, a VM exit handler address specified by a processor-specific data structure associated with the virtual machine; and
determining that the identifier of the reason of the VM exit satisfies the first condition further comprises reading the identifier from the processor-specific data structure.

* * * * *